(12) United States Patent
Oneda

(10) Patent No.: US 12,528,040 B2
(45) Date of Patent: Jan. 20, 2026

(54) HONEYCOMB FILTER

(71) Applicant: NGK INSULATORS, LTD., Nagoya (JP)

(72) Inventor: Takahiro Oneda, Kariya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/502,202

(22) Filed: Nov. 6, 2023

(65) Prior Publication Data

US 2024/0198269 A1 Jun. 20, 2024

(30) Foreign Application Priority Data

Dec. 14, 2022 (CN) .......................... 202211604813.2

(51) Int. Cl.
*B01D 46/24* (2006.01)

(52) U.S. Cl.
CPC ....... *B01D 46/244* (2013.01); *B01D 46/2429* (2013.01); *B01D 46/24491* (2021.08); *B01D 46/2459* (2013.01); *B01D 46/2474* (2013.01); *B01D 46/2482* (2021.08); *B01D 46/249* (2021.08)

(58) Field of Classification Search
CPC ............ B01D 46/244; B01D 46/24491; B01D 46/2482; B01D 46/249; B01D 46/2429; B01D 46/2459; B01D 46/2474; B01D 46/2498; B01D 46/24492; B01D 46/24;

(Continued)

(56) References Cited

U.S. PATENT DOCUMENTS

2004/0258582 A1* 12/2004 Miwa .................... F01N 3/0222
422/177
2008/0083202 A1* 4/2008 Kunieda .................. B01J 35/56
428/116
(Continued)

FOREIGN PATENT DOCUMENTS

JP        2011245397 A   * 12/2011   ........... B28B 11/006
JP        2020-163286 A   10/2020

*Primary Examiner* — Jennifer Dieterle
*Assistant Examiner* — Qianping He
(74) *Attorney, Agent, or Firm* — BURR PATENT LAW, PLLC

(57) ABSTRACT

A honeycomb filter includes a honeycomb structure having a porous partition wall and a plurality of plugging portions, wherein a porosity of the plugging portion is 40 to 60%, a central plugging portion having a plugging length of 5 mm or more and an outer peripheral plugging portion having the plugging length of less than 5 mm are disposed, an average plugging length $L1_{(Ave)}$ is 5 mm or more and 10 mm or less, an average plugging length $L2_{(Ave)}$ is 2 mm or more and less than 5 mm, a difference between $L1_{(Ave)}$ and $L2_{(Ave)}$ is 2 to 6 mm, a ratio of an average radius of the center part to an equivalent circle radius of the end face is 0.2 to 0.5, the plugging portion is composed of a plurality of particles, an average value of an equivalent circle diameter of each particle is 3 to 5 μm, and a particle density is 750 to 1250 particles/mm$^2$.

4 Claims, 5 Drawing Sheets

(58) Field of Classification Search
CPC .............. B01D 46/429; C04B 38/0054; C04B 38/0074
USPC ......................................................... 55/523
See application file for complete search history.

(56) References Cited

U.S. PATENT DOCUMENTS

| | | | |
|---|---|---|---|
| 2010/0058725 A1* | 3/2010 | Konomi | ............. B01D 46/2482 427/193 |
| 2020/0306740 A1 | 10/2020 | Yoshioka | |
| 2021/0299610 A1* | 9/2021 | Fukuyo | ............... C04B 38/0006 |

* cited by examiner

HONEYCOMB FILTER

RELATED APPLICATIONS

The present application is an application based on Chinese Patent Application No. 202211604813.2 filed on Dec. 14, 2022 with State Intellectual Property Office of the people's Republic of China, the entire contents of which are incorporated herein by reference.

BACKGROUND OF THE INVENTION

Field of the Invention

The present invention relates to a honeycomb filter. More specifically, the present invention relates to a honeycomb filter having excellent erosion resistance and excellent thermal shock resistance.

Description of the Related Art

Conventionally, a honeycomb filter using a honeycomb structure has been known as a filter for trapping particulate matter in exhaust gas emitted from an internal combustion engine such as an automobile engine or a device for purifying toxic gas components such as CO, HC, NOx (see Patent Document 1). The honeycomb structure includes a partition wall made of porous ceramics such as cordierite and a plurality of cells defined by the partition wall. A honeycomb filter includes such a honeycomb structure provided with plugging portions so as to plug the open ends at the inflow end face side and the outflow end face side of the plurality of cells alternately. In other words, the honeycomb filter has a structure in which inflow cells having the inflow end face side open and the outflow end face side plugged and outflow cells having the inflow end face side plugged and the outflow end face side open are arranged alternately with the partition wall therebetween. In the honeycomb filter, the porous partition wall serves as a filter for trapping the particulate matter in exhaust gas. Hereinafter, the particulate matter contained in exhaust gas may be referred to as "PM". The "PM" is an abbreviation for "Particulate Matter."

[Patent Document 1] JP-A-2020-163286

Erosion is one of the damages that honeycomb filters receive during use. The erosion refers to a phenomenon in which foreign matters such as weld sputter and wear powder of an engine collide with a honeycomb filter on an airflow, and the inlet end face of the honeycomb filter is worn. As a countermeasure against such erosion, it has been studied to increase the length of the plugging portion disposed on the end face of the honeycomb filter and to lower the porosity of the plugging portion.

However, when the length of the plugging portion is increased or the porosity of the plugging portion is decreased in order to increase the resistance to erosion, a heat capacity of the honeycomb filter is increased and the light-off performance is deteriorated. The light-off performance refers to a thermal property in which the purification performance of the catalyst for purifying exhaust gas loaded on the honeycomb filter is exhibited.

In addition, during the use the honeycomb filter, since PM such as soot accumulates on the partition wall that defines the cell that serves as a through channel for the exhaust gas, the through channel may be blocked and the fuel efficiency may be deteriorated. For this reason, the honeycomb filter may be subjected to a regeneration process of burning and removing PM accumulated on the partition wall periodically. By performing regeneration process of the honeycomb filter, the blockage of the through channel can be eliminated, and deterioration in the fuel efficiency can be improved. In order to improve the fuel efficiency, it is desirable to extend the interval of the regeneration process. However, since thermal shock is applied during the regeneration process, there is a limit to extending the interval. In particular, as described above, when the length of the plugging portion is increased as a countermeasure against the erosion, the effect of the thermal swell of the plugging portion during the regeneration process becomes large, and thermal shock resistance of the honeycomb filter may be lowered.

As described above, in the conventional honeycomb filter, the improvement in erosion resistance and the improvement in thermal shock resistance are contrary to each other, and it is very difficult to solve both at the same time. Therefore, there is a demand for the development of a honeycomb filter having excellent erosion resistance and capable of withstanding greater thermal shock.

The present invention has been made in view of the problems with the prior arts described above. According to the present invention, a honeycomb filter having excellent erosion resistance and excellent thermal shock resistance can be provided.

SUMMARY OF THE INVENTION

According to the present invention, a honeycomb filter described below is provided.

[1] A honeycomb filter including: a pillar-shaped honeycomb structure having a porous partition wall disposed to surround a plurality of cells which serve as a fluid through channel extending from an inflow end face to an outflow end face; and a plurality of plugging portions disposed at either an end on the inflow end face side or an end on the outflow end face side of the cell; wherein a porosity of the plugging portion is 40 to 60%, at a center part side of an end on the inflow end face side or an end on the outflow end face side of the honeycomb structure, a central plugging portion having a plugging length L in an extending direction of the cell of 5 mm or more is disposed as the plugging portion, and at an outer peripheral part side outside the center part of the end, an outer peripheral plugging portion having the plugging length L of less than 5 mm is disposed as the plugging portion, an average plugging length $L1_{(Ave)}$, which is an average value of the plugging length L in the center part, is 5 mm or more and 10 mm or less, an average plugging length $L2_{(Ave)}$, which is an average value of the plugging length L in the outer peripheral part, is 2 mm or more and less than 5 mm, a difference $\Delta L$ between the average plugging length $L1_{(Ave)}$ in the center part and the average plugging length $L2_{(Ave)}$ in the outer peripheral part is 2 to 6 mm, a ratio (R/D) of an average radius R of the center part to an equivalent circle radius D of the end face of the honeycomb structure is 0.2 to 0.5, and in an electron microscope image of the plugging portion, the plugging portion is composed of a plurality of particles, an average value of an equivalent circle diameter of each particle is 3 to 5 μm, and a particle density of the plugging portion is 750 to 1250 particles/$mm^2$.

[2] The honeycomb filter according to [1], wherein a porosity of the partition wall is 60 to 70%.

[3] The honeycomb filter according to [1] or [2], wherein a thickness of the partition wall is 0.1 to 0.3 mm.

The honeycomb filter of the present invention has the effect of being excellent in erosion resistance, and also being excellent in thermal shock resistance.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

Figure 1:
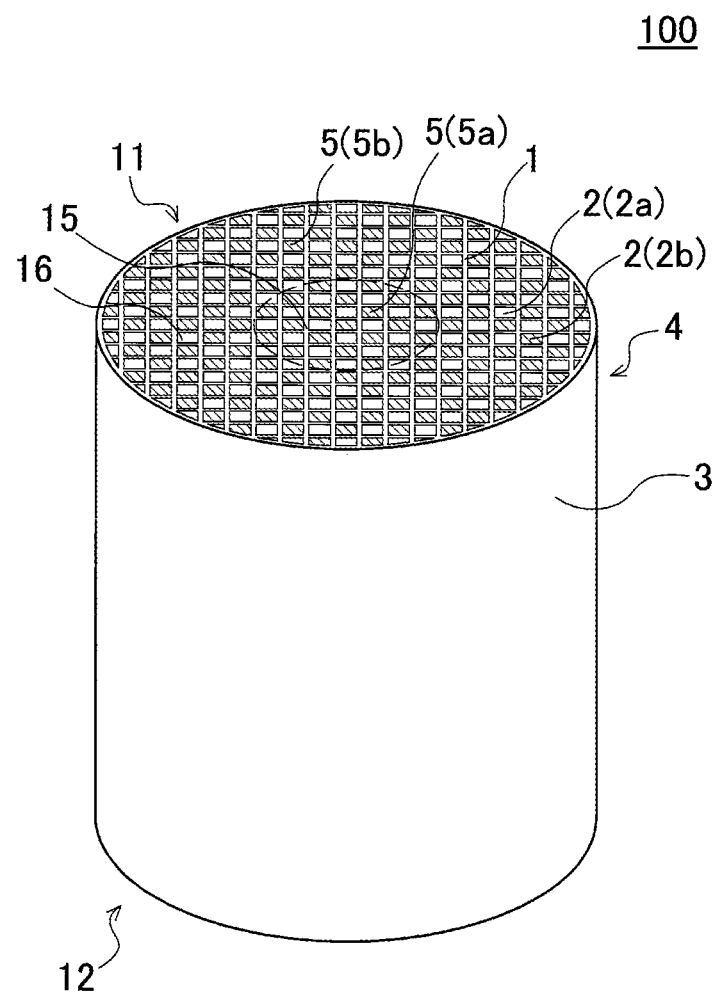
FIG. 1 is a perspective view schematically showing an embodiment of a honeycomb filter according to the present invention.
Figure 2:
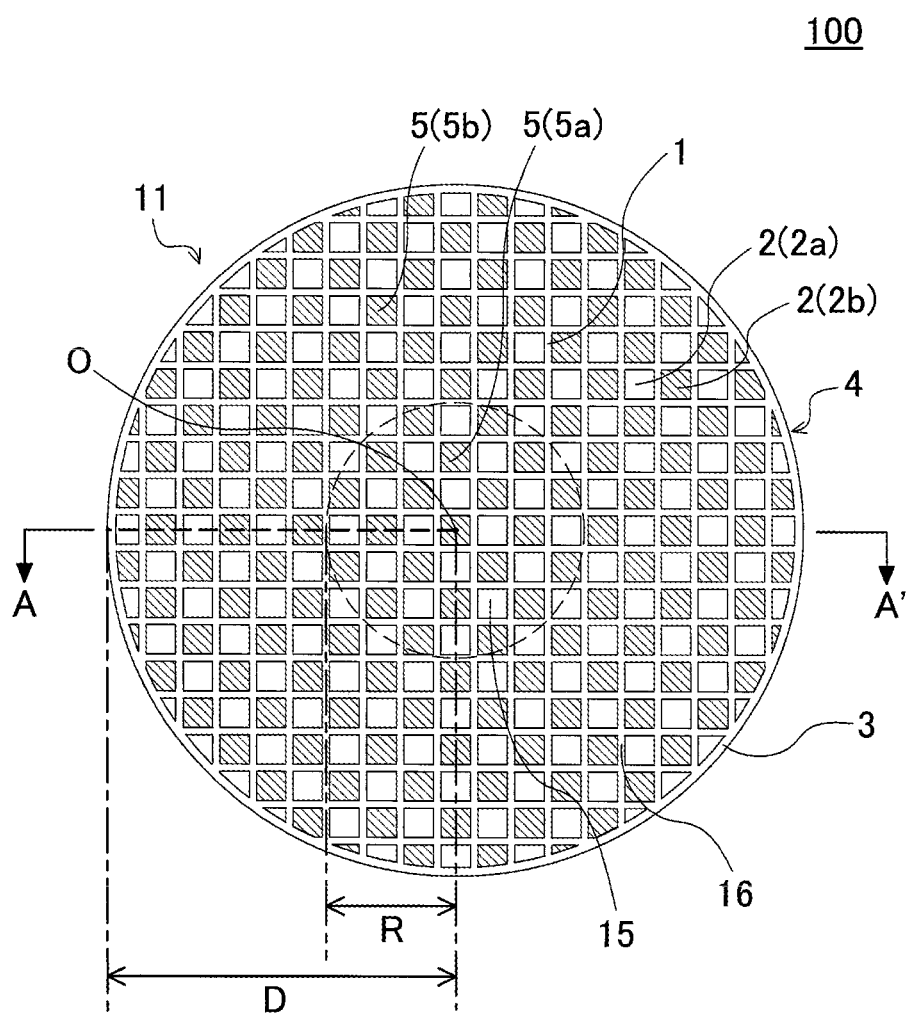
FIG. 2 is a plan view showing the inflow end face side of the honeycomb filter shown in FIG. 1.
Figure 3:
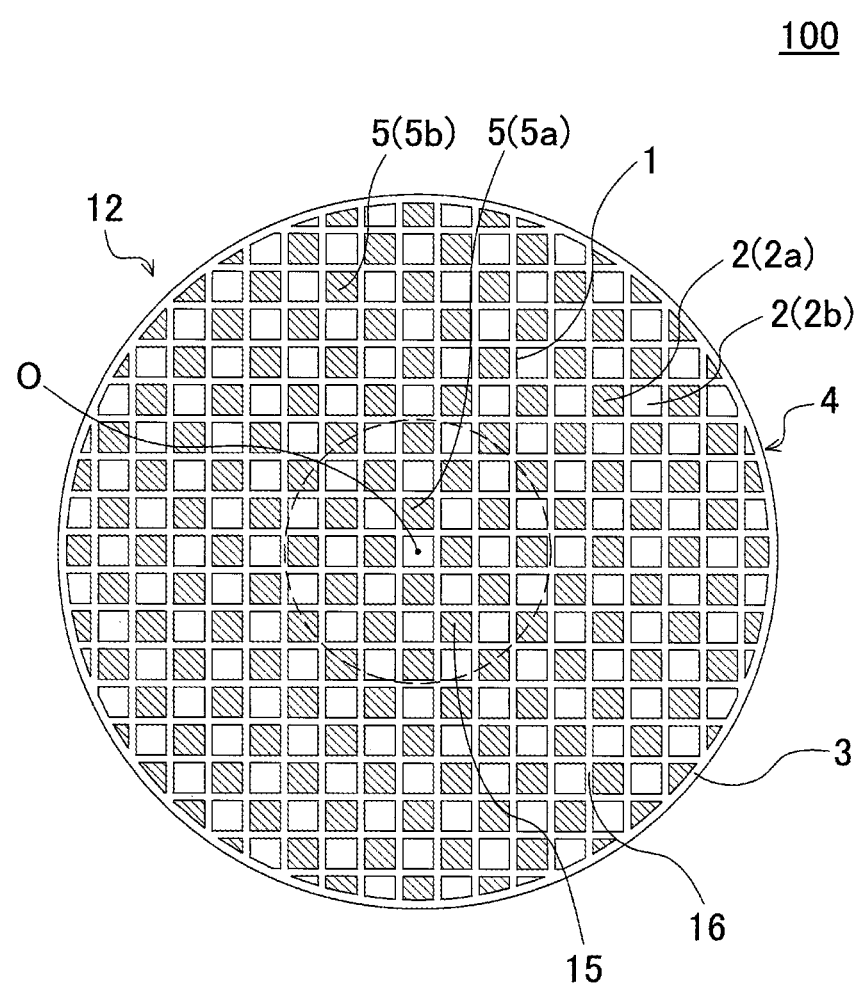
FIG. 3 is a plan view showing the outflow end face side of the honeycomb filter shown in FIG. 1.
Figure 4:
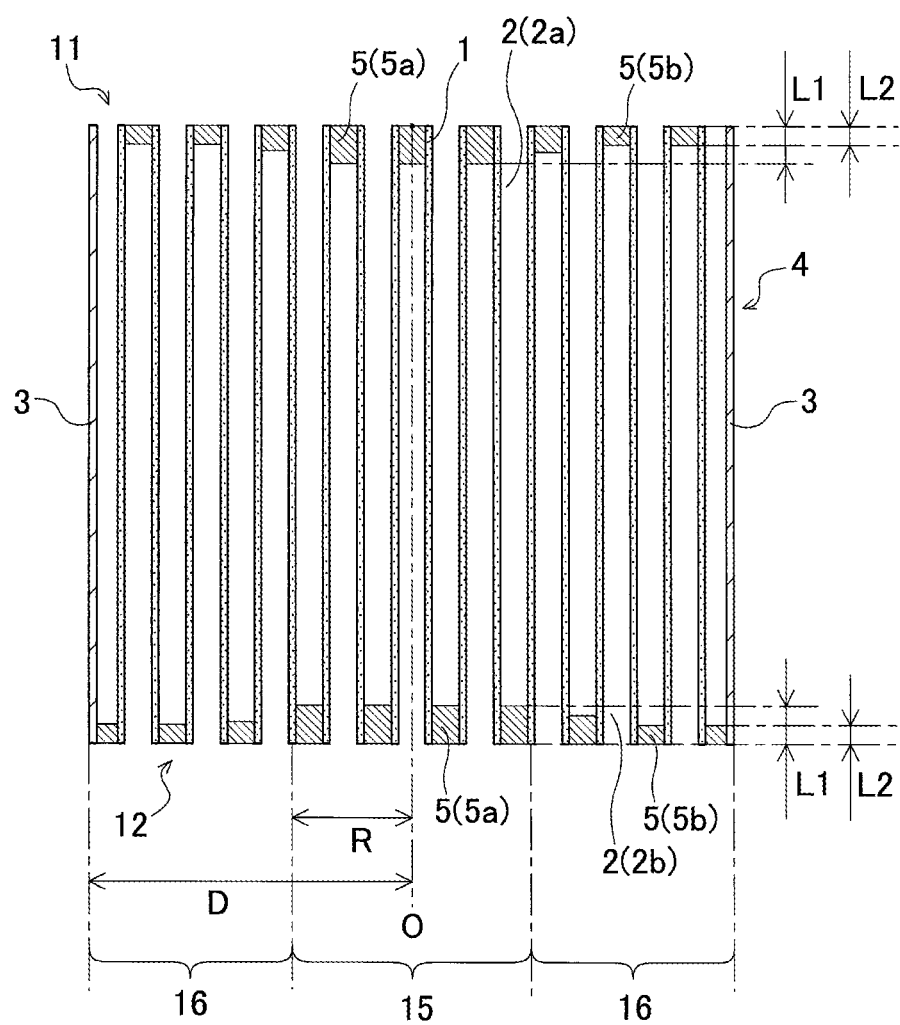
FIG. 4 is a sectional view schematically showing a section taken along the line A-A' of FIG. 2.

(1) Honeycomb Filter:

An embodiment of the honeycomb filter of the present invention is a honeycomb filter 100 as shown in FIGS. 1 to 4. Here, FIG. 1 is a perspective view schematically showing an embodiment of the honeycomb filter of the present invention. FIG. 2 is a plan view showing an inflow end face side of the honeycomb filter shown in FIG. 1, and FIG. 3 is a plan view showing an outflow end face side of the honeycomb filter shown in FIG. 1. FIG. 4 is a sectional view schematically showing a section taken along the line A-A' of FIG. 2.

As shown in FIGS. 1 to 4, the honeycomb filter 100 of the present embodiment includes a honeycomb structure 4 and a plugging portion 5. The honeycomb structure 4 is of pillar-shaped having a porous partition wall 1 disposed to surround a plurality of cells 2 which serve as a fluid through channel extending from one end face 11 to the other end face 12. In the honeycomb filter 100, the honeycomb structure 4 has a pillar shape, and further includes a circumferential wall 3 at the outer peripheral side face. In other words, the circumferential wall 3 is provided to encompass the partition wall 1 provided in a grid pattern. Hereinafter, one end face 11 of the honeycomb structure 4 and the honeycomb filter 100 may be referred to as an "inflow end face 11", for example. The other end face 12, which is the other end face of the honeycomb structure 4 and the honeycomb filter 100, may be referred to as an "outflow end face 12", for example.

The plugging portions 5 are disposed at open ends on the inflow end face 11 side or the outflow end face 12 side of each of the cells 2. In the honeycomb filter 100 shown in FIGS. 1 to 4, the plugging portions 5 are disposed at open ends at the ends on the inflow end face 11 side of predetermined cells 2 and at open ends at the ends on the outflow end face 12 side of the remaining cells 2, respectively. The cell 2 in which the plugging portion 5 is disposed at open end on the outflow end face 12 side and the inflow end face 11 side is opened is defined as an inflow cell 2a. Further, the cell 2 in which the plugging portion 5 is disposed at the open end on the inflow end face 11 side and the outflow end face 12 side is opened is defined as an outflow cell 2b. The inflow cell 2a and the outflow cell 2b are preferably disposed alternately with the partition wall 1 therebetween. In addition, it is preferable that a checkerboard pattern is thereby formed by the plugging portions 5 and "the open ends of the cells 2" on both end faces of the honeycomb filter 100.

The honeycomb structure 4 includes, in a section orthogonal to the extending direction of the cells 2, a center part 15 including a center of gravity O of the section and an outer peripheral part 16 located outside the center part 15. For example, as shown in FIGS. 2 and 3, a certain area from the center of gravity O to the outer periphery including the center of gravity O of the section of the honeycomb structure 4 is a "center part 15", and an area closer to the outer periphery than the center part 15 is an "outer peripheral part 16".

The honeycomb filter 100 of the present embodiment has particularly major properties with respect to the porosity of the plugging portion 5 and the configuration of the plugging portion 5 in the center part 15 and the outer peripheral part 16 described above. That is, in the honeycomb filter 100 of the present embodiment, the porosity of the plugging portion 5 is 40 to 60%. In addition, a central plugging portion 5a having a plugging length L1 in the extending direction of the cell 2 as a plugging portion 5 of 5 mm or more is disposed on the center part 15 side at an end on the inflow end face 11 side or at an end on the outflow end face 12 side. Further, an outer peripheral plugging portion 5b having a plugging length L2 in the extending direction of the cell 2 as a plugging portion 5 less than 5 mm is disposed on the outer peripheral part 16 side outside the center part 15 at the end of the honeycomb structure 4 described above. Hereinafter, the length L in the extending direction of the cell 2 in the plugging portion 5 as described above may be simply referred to as a "plugging length L" of the plugging portion 5. In addition, the plugging length L of the central plugging portion 5a may be referred to as a "plugging length L1", and the plugging length L of the outer peripheral plugging portion 5b may be referred to as a "plugging length L2". That is, the central plugging portion 5a is a plugging portion 5 having a plugging length L1 of 5 mm or more, and the outer peripheral plugging portion 5b is a plugging portion 5 having a plugging length L2 of less than 5 mm.

In the center part 15, the average plugging length $L1_{(Ave)}$, which is the average value of the plugging length L of the plugging portion 5 present in the center part 15, is 5 mm or more and less than 10 mm. On the other hand, in the outer peripheral part 16, the average plugging length $L2_{(Ave)}$, which is the average value of the plugging length L of the plugging portion 5 present in the outer peripheral part 16, is 2 mm or more and less than 5 mm. Then, the difference ΔL between the average plugging length $L1_{(Ave)}$ in the center part 15 and the average plugging length $L2_{(Ave)}$ in the outer peripheral part 16 is 2 to 6 mm.

In the honeycomb filter 100 of the present embodiment, the ratio (R/D) of the average radius R of the center part 15 to the equivalent circle radius D of the end face of the honeycomb structure 4 is 0.2 to 0.5. The equivalent circle radius D of the end face of the honeycomb structure 4 can be obtained from the square root of the value obtained by dividing the area A of the end face of the honeycomb structure 4 by the circumference ratio π (i.e., $D=\sqrt{(A/\pi)}$).

In addition, the plugging portion 5 consisting of a central plugging portion 5a and an outer peripheral plugging portion 5b has the following structure with respect to its microstructure. That is, in an electron microscope image of the plugging portion 5, the plugging portion 5 is composed of a plurality of particles, an average value of an equivalent circle diameter of each particle is 3 to 5 μm, and a particle density of the plugging portion 5 is 750 to 1250 particles/mm$^2$.

The honeycomb filter 100 of the present embodiment configured as described above has excellent erosion resistance and excellent thermal shock resistance.

As described above, in the honeycomb filter 100 of the present embodiment, a central plugging portion 5a having a relatively long plugging length is disposed in the center part 15 at ends on each end face side of the honeycomb structure 4. In the center part 15 of the honeycomb structure 4, since the heat generated during regeneration process is more than the outer peripheral part 16 outside the center part 15, by disposing a central plugging portion 5a having a long plugging length and a relatively large volume in the center part 15, thermal shock resistance of the honeycomb filter 100 is improved. Further, since erosion is more likely to occur in the center part 15 of the honeycomb structure 4 than in the outer peripheral part 16, the erosion resistance is also improved by the central plugging portion 5a having a long plugging length. On the other hand, the outer peripheral plugging portion 5b having a relatively short plugging length generates less thermal stress, and therefore, by disposing such an outer peripheral plugging portion 5b in the outer peripheral part 16, damage such as cracks is less likely to occur on the outer peripheral part 16 side of the honeycomb structure 4. For example, it is possible to effectively suppress the occurrence of cracks in the end face on the outer peripheral part 16 side of the honeycomb structure 4 and cracks in the circumferential wall 3 (for example, an outer peripheral coating layer described later) of the honeycomb structure 4.

For example, when the average plugging length $L1_{(Ave)}$ in the center part 15 and the average plugging length $L2_{(Ave)}$ in the outer peripheral part 16 are outside each numerical range described above, the effects described above may not be sufficiently exhibited. The same applies when the difference ΔL between the average plugging length $L1_{(Ave)}$ and the average plugging length $L2_{(Ave)}$ is outside the numerical range described above. It is also essential that the ratio (R/D) of the average radius R of the center part 15 to the equivalent circle radius D of the end face of the honeycomb structure 4 is 0.2 to 0.5 in order to effectively express the effects described above. Hereinafter, the ratio (R/D) of the average radius R of the center part 15 to the equivalent circle radius D of the end face of the honeycomb structure 4 may be referred to as an "average radius ratio (R/D) of the center part 15". If the average radius ratio (R/D) of the center part 15 is less than 0.2, the number of the central plugging portion 5a is too small, and sufficient thermal shock resistance and erosion resistance may not be obtained. On the other hand, if the average radius ratio (R/D) of the center part 15 is greater than 0.5, the number of the outer peripheral plugging portion 5b is too small, and a sufficient effect of suppressing the occurrence of cracks may not be obtained.

In the honeycomb filter 100 of the present embodiment, a porosity of the plugging portion 5 is 40 to 60%, and the plugging portion 5a has a relatively dense structure. By setting the porosity of the plugging portion 5 to 40 to 60%, the erosion resistance is improved. Incidentally, when the porosity of the plugging portion 5 is less than 40%, the thermal stress generated in the plugging portion 5 increases, which is not preferable.

In addition, the plugging portion 5 is a porous material having a microstructure composed of a plurality of particles in its electron microscope images. In particular, the plugging portion 5 is composed of a plurality of particles in the electron microscope images, and has a particle density of 750 to 1250 particles/mm$^2$. In addition, the plugging portion 5 has an average value of an equivalent circle diameter of each particle constituting the plugging portion 5 of 3 to 5 μm. The "average value of an equivalent circle diameter of each particle" is an arithmetic average obtained by dividing the sum of the equivalent circle diameters of each particle by the number of the particles. With this configuration, the void between the particles constituting the plugging portion 5 serves as a cushion, the heat swell during regeneration treatment can be reduced, and the occurrence of cracks or the like on the end face and the circumferential wall 3 side of the honeycomb structure 4 can be effectively suppressed. For example, the plugging portion 5 composed of such a plurality of particles is preferably an unfired body in which the plurality of particles do not sinter. Since the plugging portion 5 of the unfired body does not shrink during firing, the residual stress in the manufacturing process is smaller than those of the fired body. As described above, the plugging portion 5 having low residual stress is less likely to occur cracks on the end face and the circumferential wall 3 side of the honeycomb structure 4.

The porosity of the plugging portion 5 and the microstructure described above can be measured by the following methods.

First, a sample for measurement is cut out from the plugging portion 5 to be measured. Specifically, a range of 15 mm×15 mm in length and width around the center of gravity of the end face 11 of the honeycomb structure 4 is cut out from the end face 11 to a depth of 15 mm, and a sample for measurement is obtained which is a cube having one side of 15 mm. The plugging portion 5 contained in such a sample for measurement is used as a measurement target.

Next, the plugging portion 5 present on the cut surface of the obtained sample for measurement is imaged using a scanning electron microscope (hereinafter, also referred to as "SEM"), and a SEM image having a magnification of 100 times is obtained. "SEM" is an abbreviation for "Scanning Electron Microscope." The SEM image is an image in which one pixel is 0.992 μm in length by 0.992 μm in width. As the scanning electron microscope, for example, a scanning electron microscope "S-3400N" manufactured by Hitachi High-Tech Corporation can be used. The SEM image thus obtained is subjected to image analysis using two-dimensional image analysis software (manufactured by Mitani Corporation: WinROOF (trade name)). The conditions for the image analysis are threshold values of 0.000 and 35.000 and transparency of 127. In the analysis mode of WinROOF (trade name), "black-and-white inversion" is performed, and then the analysis items of "shape feature" are selected.

In this way, the particle area and particle density of the particles constituting the plugging portion 5 in the SEM image can be calculated. Further, the porosity of the plugging portion 5 can be calculated by calculating an area of a void part other than the particles in the SEM image and calculating an area ratio of the void part in the SEM image. The analysis using the SEM image of the plugging portion 5 is performed on SEM images of five fields of view, and the average of the analysis results of three fields of view excluding the maximum value and the minimum value of the measured results are obtained.

Figure 5:
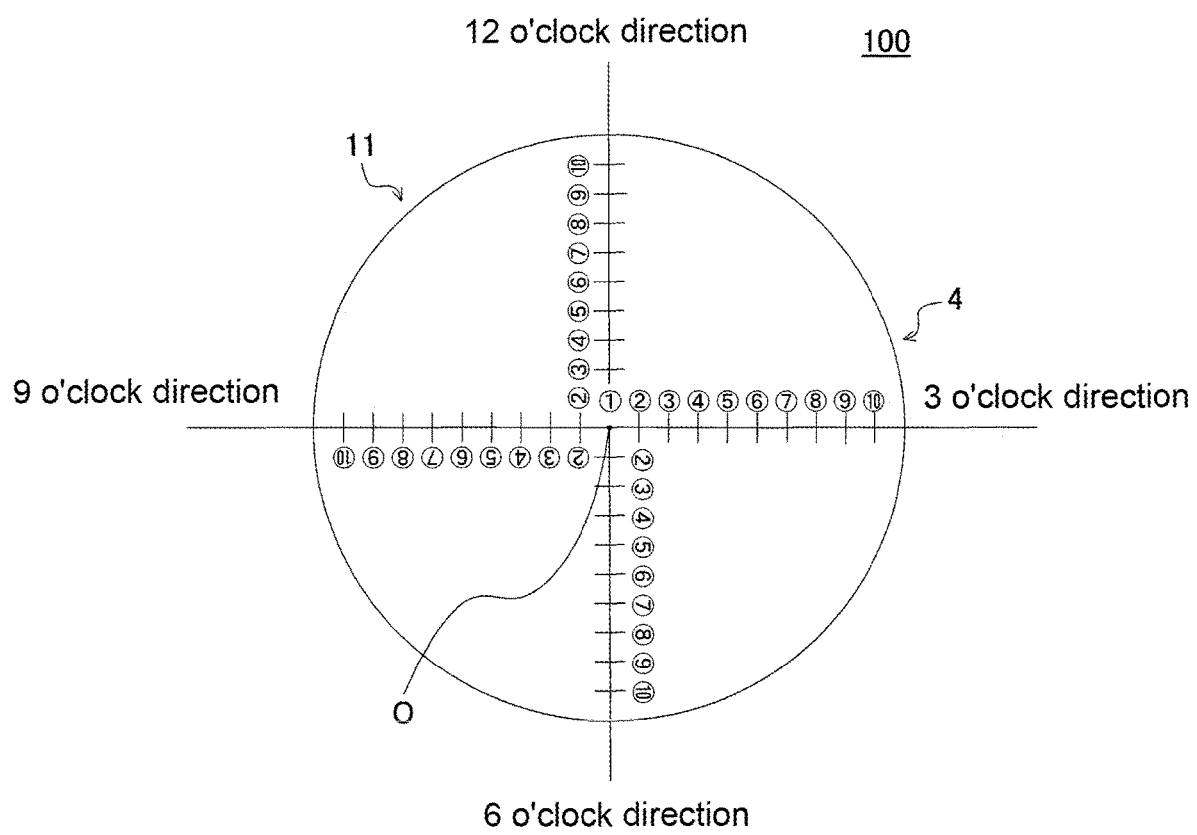
FIG. 5 is an explanatory view for explaining a measuring method of the plugging length of the plugging portion, and is a schematic diagram showing the inflow end face side of the honeycomb filter.

The plugging length of the plugging portion 5 can be measured by the following methods. That is, the plugging length L1 of the central plugging portion 5a and the plugging length L2 of the outer peripheral plugging portion 5b, and the average plugging length $L1_{(Ave)}$ and the average plugging length $L2_{(Ave)}$ in the center part 15 and the outer peripheral part 16, described above, are measured by the following measuring method. Here, FIG. 5 is an explanatory diagram for explaining a measuring method of the plugging length of the plugging portion 5 (see FIG. 2, hereinafter, the same), and is a schematic diagram showing an inflow end face 11 side of the honeycomb filter 100. FIG. 5 is drawn in a form in which the partition wall 1 (see FIG. 2) and the cell 2 (see FIG. 2) on the inflow end face 11 of the honeycomb filter 100 are abstracted. Further, in the following explanation, the "inflow end face 11" of the honeycomb filter 100 may be simply referred to as the "end face 11" of the honeycomb filter 100.

In measuring the plugging length of the plugging portion (see FIG. 2), the plugging length is measured in the cross-direction starting from the center of gravity O of the end face 11 of the honeycomb filter 100 as shown in FIG. 5. Here, the "center of gravity O" of the end face 11 of the honeycomb filter 100 refers to a center of gravity in the geometric sense (in other words, a geometric center) of the end face 11. A more specific measuring method of the plugging length is as follows. First, as the measurement point, the radial direction from the center of gravity O of the end face 11 to the outer periphery is divided by 10, respectively, and a total of 40 points in the 4 directions of the 12 o'clock direction, the 3 o'clock direction, the 6 o'clock direction, and the 9 o'clock direction are set. In FIG. 5, the measurement points at 10 points in each radial direction are indicated by encircled numbers of 1 to 10. The measurement point of the center of gravity O (that is, the measurement point of the encircled number 1 in FIG. 5) overlaps as the measurement point in each radial direction. The plugging length of the plugging portion 5 (see FIG. 2) is measured at each of the 40 measurement points set in this way. The plugging length can be measured, for example, by inserting a rod that is longer than the entire length of the honeycomb filter 100 and whose length is known into the cell 2 (see FIG. 2) to obtain the difference between the length of the rod exposed from the honeycomb filter 100 and the length of the rod itself. When the end face 11 of the honeycomb filter 100 has a circular shape, the 4 directions of the 12 o'clock direction, the 3 o'clock direction, the 6 o'clock direction, and the 9 o'clock direction described above can be any cross direction starting from the center of gravity O. When the end face 11 of the honeycomb filter 100 has a shape other than a circular shape, the two axes in the cross direction described above are specified as follows. First, the longest axis of the axis passing through the center of gravity O of end face 11 of the honeycomb filter 100 is defined as the first axis. Hereinafter, the longest axis is referred to as a "long axis". Then, an axis passing through the center of gravity O of the end face 11 and perpendicular to the long axis is defined as a second axis. Hereinafter, the second axis is referred to as a "short axis".

As described above, after measuring the plugging length at 40 points (37 points when considering the overlapping center of gravity O as one point), using the measurement results of the plugging length, the boundary is defined between the center part 15 (see FIG. 2) and the outer peripheral part 16 (see FIG. 2) on the end face 11 where the plugging length is measured. Specifically, in each radial direction of the end face 11, the lengths in the radial direction counting from the center of gravity O and finally satisfying the plugging length of 5 mm are r3, r6, r9, and r12, respectively. Moreover, r3 is the length in the radial direction counting from the center of gravity O and finally satisfying the plugging length of 5 mm at the measurement point in the 3 o'clock direction, and r6, r9, and r12 are the lengths in the radial direction counting from the center of gravity O and finally satisfying the plugging length of 5 mm in the 6 o'clock direction, the 9 o'clock direction, and the 12 o'clock direction, respectively. The arithmetic mean of r3, r6, r9, and r12 thus obtained is defined as the average radius R of the center part 15 (see FIG. 2).

When the end face 11 of the honeycomb filter 100 has a circular shape, the inner side of the obtained average radius R (that is, the center of gravity O side in the end face 11) is defined as the center part 15 (see FIG. 2), and the outer side thereof is defined as the outer peripheral part 16 (see FIG. 2).

When the end face 11 of the honeycomb filter 100 has a shape other than a circular shape, first, the center of gravity O of the end face 11 is set to 0%, and the 9 measurement points in the radial direction of the respective axes are set to 10%, 20%, 30%, 40%, 50%, 60%, 70%, 80%, and 90% measurement points in order toward the outer side. Then, in each radial direction of the end face 11, the above-described percentages at the measurement points counting from the center of gravity O and finally satisfying the plugging length of 5 mm (that is, the measurement points corresponding to the above-described r3, r6, r9, and r12) are obtained, and the arithmetic mean thereof is obtained. For example, if r3 is 50%, r6 is 40%, r9 is 60%, and r12 is 40%, then the arithmetic mean of the percentages is (50%+40%+60%+40%)/4=47.5%. The arithmetic mean of the percentages thus obtained is the similarity ratio of the center part 15 (see FIG. 2) when the end face 11 of the honeycomb filter 100 is set to 100%. That is, the center part 15 (see FIG. 2) is specified to have a shape having the center of gravity O of the end face 11 of the honeycomb filter 100 as a center of gravity thereof and having the similarity ratio with the end face 11 of 100:47.5. Therefore, the inner side of the shape having the similarity ratio with the end face 11 of 100:47.5 (i.e., the center of gravity O side in the end face 11) is defined as the center part 15 (see FIG. 2) and the outer side thereof is defined as the outer peripheral part 16 (see FIG. 2). It should be noted that the above-described method for specifying the center part 15 assume that the shape of the end face 11 is other than a circular shape, but can be applied even when the shape of the end face 11 is a circular shape by fitting the long axis and the short axis specified in the case other than a circular shape to any cross-direction axis in the case of a circular shape.

Then, the average plugging length $L1_{(Ave)}$ and the average plugging length $L2_{(Ave)}$ can be calculated by determining the arithmetic mean of the plugging length measured at the measurement points included in each area after defining the center part 15 (see FIG. 2) and the outer peripheral part 16 (see FIG. 2) as described above. The average radius ratio (R/D) of the center part 15 (see FIG. 2) can also be obtained from the average radius R obtained as described above and the equivalent circle radius D of the end face 11.

In the honeycomb filter 100 as shown in FIGS. 1 to 4, a porosity of the plugging portion 5 may be 40 to 60%, for example, preferably 45 to 55%, and more preferably 47 to 53%. Although not particularly limited, the porosity of the plugging portion 5 is preferably lower than the porosity of the partition wall 1. With this configuration, it is possible to achieve excellent erosion resistance.

The average plugging length $L1_{(Ave)}$ in the center part 15 may be 5 mm or more and 10 mm or less, but is preferably 7 mm or more and 10 mm or less, and more preferably 9 mm or more and 10 mm or less, for example. The average plugging length $L2_{(Ave)}$ in the outer peripheral part 16 may be 2 mm or more and less than 5 mms, for example, preferably 2 mm or more and less than 4 mm, and more preferably 2 mm or more and less than 3 mm.

The difference $\Delta L$ between the average plugging length $L1_{(Ave)}$ and the average plugging length $L2_{(Ave)}$ may be 2 to 6 mm, but is preferably 3 to 6 mm, and more preferably 4 to 5 mm.

The ratio of the average radius R (R/D) of the center part 15 may be 0.2 to 0.5, preferably 0.3 to 0.5, and more preferably 0.4 to 0.5.

The microstructure in the electron microscope image of the plugging portion 5 is also as described above, for example, the average particle area of the particles constituting plugging portion 5 is preferably 2 to 5 $\mu m^2$, and more preferably 2 to 4 $\mu m^2$. The particle density of the particles constituting the plugging portion 5 is preferably 800 to 1200 particles/$mm^2$, more preferably 900 to 1100 particles/$mm^2$. In addition, as described above, the particles constituting the plugging portion 5 have an average value of an equivalent circle diameter of each particle of 3 to 5 $\mu m$. The equivalent circle diameter of each particle can be obtained by determining the area S of each particle in the microstructure analysis in the electron microscope images described so far, and calculating the equivalent circle diameter ($\mu m$) of the particles=$\sqrt{\{4\times(\text{area S }(\mu m^2)\text{ of the particle})/\pi\}}$.

The porosity of the partition wall 1 of the honeycomb structure 4 is preferably 60 to 70%, more preferably 62 to 68%, and particularly preferably 64 to 66%. The porosity of the partition wall 1 is measured by mercury press-in method. The porosity of the partition wall 1 can be measured using, for example, Autopore 9500 (trade name) manufactured by Micromeritics. If the porosity of the partition wall 1 is less than 60%, it is not preferable in terms of pressure loss. If the porosity of the partition wall 1 exceeds 70%, it is not preferable in terms of the soot trapping efficiency.

The honeycomb structure 4 preferably has a thickness of the partition wall 1 of 0.1 to 0.3 mm, more preferably 0.1 to 0.2 mm. The thickness of the partition wall 1 can be measured, for example, using a profile projector. If the thickness of the partition wall 1 is less than 0.1 mm, enough strength may not be obtained. On the other hand, when the thickness of partition wall 1 exceeds 0.3 mm, pressure loss may increase.

The shape of the cells 2 formed in the honeycomb structure 4 is not particularly limited. For example, the shape of the cells 2 in the section orthogonal to the extending direction of the cells 2 may be polygonal, circular, elliptical or the like. Examples of the polygonal shape include a triangle, a quadrangle, a pentagon, a hexagon, and an octagon. The shape of the cells 2 is preferably triangular, quadrangular, pentagonal, hexagonal or octagonal. Further, regarding the shape of the cells 2, all the cells 2 may have the same shape or different shapes. For example, although not shown, quadrangular cells and octagonal cells may be combined. Further, regarding the size of the cells 2, all the cells 2 may have the same size or different sizes. For example, although not shown, some of the plurality of cells may be larger, and other cells may be relatively smaller. In the present invention, the cell 2 refer to a space surrounded with the partition wall 1.

The cell density of the cell 2 defined by the partition wall 1 is preferably 42 to 51 cells/$cm^2$, more preferably 44 to 49 cells/$cm^2$. With this configuration, it can be suitably used as a filter for trapping PM in exhaust gas emitted from automobile engines.

The circumferential wall 3 of the honeycomb structure 4 may be configured integrally with the partition wall 1, or may be a circumferential coat layer formed by applying a circumferential coating material so as to encompass the partition wall 1. Although not shown, the circumferential coat layer can be provided on the circumferential side of the partition wall after the partition wall and the circumferential wall are integrally formed and then the formed circumferential wall is removed by a known method, such as grinding in a manufacturing process.

The shape of the honeycomb structure 4 is not particularly limited. The shape of the honeycomb structure 4 can be a pillar-shape in which the shape of the inflow end face 11 and the outflow end face 12 includes a circular shape, an elliptical shape, a polygonal shape or the like.

The size of the honeycomb structure 4, for example, the length of the honeycomb structure 4 in the extending direction of the cells 2 (hereinafter, also referred to as "total length") and the size of a section orthogonal to the extending direction of the cells 2 of the honeycomb structure 4 (hereinafter, also referred to as "sectional area"), is not particularly limited. Each size may be selected as appropriate such that optimum purification performance is obtained when the honeycomb filter 100 is used.

The material of the partition wall 1 is not particularly limited. For example, the material of the partition wall 1 preferably includes at least one selected from the group consisting of silicon carbide, cordierite, silicon-silicon carbide composite material, cordierite-silicon carbide composite material, silicon nitride, mullite, alumina, and aluminum titanate.

In addition, the material of the plugging portion 5 is not particularly limited, but is preferably a ceramic from the viewpoint of strength and thermal resistance. The ceramic is preferably a ceramic containing at least one selected from the group consisting of cordierite, mullite, zircon, aluminum titanate, silicon carbide, silicon-silicon carbide composite material, silicon nitride, zirconia, spinel, indialite, sapphirine, corundum, and titania. These ceramics may contain one kind alone or two or more kinds at the same time. The plugging portion is preferably formed of a material containing 50% by mass or more of these ceramics in total, more preferably formed of a material containing 80% by mass or more.

(2) Manufacturing Method of Honeycomb Filter

A method for manufacturing the honeycomb filter of the present invention is not particularly limited, but examples thereof include the following method.

First, a plastic kneaded material for making a partition wall of a honeycomb structure is prepared. The kneaded material for making the partition wall of the honeycomb structure can be prepared by adding an additive such as a binder, pore former, and water, as appropriate, to the raw material powder for preparing above suitable material of the partition wall. As the raw material powder, for example, powders of alumina, talc, kaolin, and silica can be used. Examples of the binder include methylcellulose and hydroxypropyl methylcellulose. Examples of the additives include surfactant.

Next the kneaded material thus obtained is extruded, thereby producing a pillar-shaped honeycomb formed body having a partition wall defining a plurality of cells and a circumferential wall disposed to encompass the partition wall. Next, the obtained honeycomb formed body is dried by microwaves and hot air, for example.

The resulting honeycomb formed body is then fired to manufacture a honeycomb structure, which is a honeycomb filter precursor before a plugging portion is disposed. When the honeycomb formed body is fired, the firing temperature and the firing atmosphere differ depending on the raw material for producing the honeycomb formed body, and a person skilled in the art can select an optimum firing temperature and firing atmosphere for the selected material.

Next, a plugging portion is formed on the obtained honeycomb structure. The method for forming the plugging portion can be performed by the following method. For example, the inflow end face of the honeycomb structure is first masked so that the inflow cells are covered. A plugging material is then rubbed into the end of the honeycomb structure provided with a mask and an open end of the unmasked outflow cell is filled with the plugging material. Thereafter, for the outflow end face of the honeycomb structure, an open end of the inflow cell is filled with the plugging material in the same manner as described above. When the plugging material is rubbed into the end of the honeycomb structure, first, a certain amount of the plugging material is rubbed into the entire area of the end of the honeycomb structure. Thereafter, an open end of the unmasked cell at the outer periphery of the end (i.e., the cell rubbed with a certain amount of the plugging material as described above) is further masked so that all the cells at the outer peripheral part are covered by the mask. Thereafter, a certain amount of the plugging material is further rubbed only into the cell at the center part of the end, and the plugging length of the outer peripheral plugging portion at the outer peripheral part is made relatively short, and the plugging length of the center plugging portion at the center part is made relatively long. The honeycomb structure on which the plugging portion was formed is then further dried with a hot air dryer. As described above, the honeycomb filter of the present invention can be manufactured. In particular, when manufacturing the honeycomb filter of the present invention, it is preferable to fire the honeycomb formed body before forming a plugging portion, and form the plugging portion in the honeycomb structure obtained by firing. It is preferable that the formed plugging portion is not fired again but unfired.

The plugging material for forming the plugging portion is preferably prepared so as to have the microstructure of the plugging portion described above. Examples of the plugging material include a material containing 0.1 to 0.5 parts by mass of a thickener, 0.2 to 1.0 parts by mass of a binder, 7 to 15 parts by mass of pore former, and 30 to 50 parts by mass of water with respect to 100 parts by mass of ceramic raw material. Further, the plugging material is preferably prepared so that an average value of an equivalent circle diameter of each particle of the ceramic raw material is 3 to 5 µm. The average value of an equivalent circle diameter of each particle of the ceramic raw material is a value obtained by obtaining the equivalent circle diameters of each particle from the particle area obtained by WinRoof (trade name), and calculating the arithmetic average of the obtained equivalent circle diameters.

EXAMPLES

The following describes the present invention more specifically by examples, but the present invention is not at all limited by those examples.

Example 1

A kneaded material is prepared by adding 10 parts by mass of pore former, 4 parts by mass of dispersing medium, and 4 parts by mass of organic binder to 100 parts by mass of the cordierite forming raw material, followed by mixing and kneading. As the cordierite forming raw material, alumina, aluminum hydroxide, kaolin, talc, and silica were used. As the dispersing medium, water was used. As the organic binder, methylcellulose was used. As the dispersing agent, dextrin was used. As the pore former, water absorptive polymer having the average particle diameter of 5 µm was used. In the Example, the average particle diameter of the respective raw material is the particle size (D50) at an integrated value of 50% in the particle size distribution determined by the laser diffraction and scattering method.

Next, the kneaded material was extruded using a die for making a honeycomb formed body to obtain a honeycomb formed body having a pillar shape as the overall shape. The cells of the honeycomb formed body had a quadrangular shape.

Next, the honeycomb formed body was dried by a microwave dryer, and was dried completely by a hot air dryer, and then both end faces of the honeycomb formed body were cut so as to have predetermined dimensions. The honeycomb formed body was then degreased and fired to obtain a honeycomb structure.

Next, a plugging material for forming the plugging portion was prepared. Thereafter, the plugging material was used to form plugging portions in an open end of the predetermined cell on the inflow end face side and an open end of the residual cell on the outflow end face side of the honeycomb structure. As the plugging material, talc, alumina, aluminum hydroxide, kaolin, and crystalline silica were used. The plugging material was prepared by adding a binder, a thickener, and a dispersing agent to the raw materials described above. As the binder, methylcellulose and hydroxyethylmethylcellulose were used. As the thickener, polyethylene oxide was used. As the dispersing agent, polyalcohol was used. As the pore former, acrylic resin was used. The plugging material was filled by rubbing the end of the honeycomb structure as follows. First, a mask was provided on the inflow end face of the honeycomb structure so as to cover the inflow cell, and then a plugging material was rubbed on the entire area of the end of honeycomb structure provided with the mask, and the open end of the cell not provided with the mask was filled with the plugging material. Then, the open end of the cell not provided with the mask at the outer peripheral part of the end of the inflow end face side of the honeycomb structure was further provided with a mask so that all the cells at the outer peripheral part were covered by the mask. Thereafter, a certain amount of the plugging material was further rubbed only into the cells in the center part of the end, the filling length of the plugging material in the outer peripheral part was made relatively short, and the filling length of the plugging material in the center part was made relatively long. Thereafter, for the outflow end face of the honeycomb structure, the open end of the predetermined cell was filled with the plugging material in the same manner.

The honeycomb filter of Example 1 had a cylindrical shape with a length of 127 mm in the extending direction of the cell. In the honeycomb filter, an inflow end face and an outflow end face had circular shapes, and the radius of the inflow end face and the outflow end face (corresponding to the equivalent circle radius D) was 66 mm. In the honeycomb filter, a thickness of the partition wall was 0.21 mm, a porosity of the partition wall was 65%, and a cell density was 43 cells/$cm^2$. The results are shown in Table 1. The porosity of the partition wall was measured using Autopore 9500 (product name) manufactured by Micromeritics.

TABLE 1

| | Honeycomb structure | | | Microstructure | | | Plugging portion | | | Ratio of | |
| --- | --- | --- | --- | --- | --- | --- | --- | --- | --- | --- | --- |
| | Radius D of end face (mm) | Partition wall Thickness (mm) | Partition wall Porosity (%) | Cell density (cells/cm²) | Porosity (%) | Particle density (particles/mm²) | Average value of equivalent circle diameter of each particle (μm) | Center part Average plugging length L1$_{(Ave)}$ (mm) | Outer peripheral part Average plugging length L2$_{(Ave)}$ (mm) | Difference ΔL of plugging length (mm) | Average radius R in center part (R/D) | Whether or not fired |
| Example 1 | 66 | 0.21 | 65 | 43 | 51% | 883 | 4 | 6 | 4 | 2 | 0.35 | Unfired |
| Example 2 | 59 | 0.22 | 65 | 42 | 45% | 998 | 5 | 7 | 5 | 2 | 0.38 | Unfired |
| Example 3 | 66 | 0.21 | 65 | 44 | 49% | 1164 | 4 | 6 | 4 | 2 | 0.30 | Unfired |
| Example 4 | 66 | 0.22 | 65 | 43 | 48% | 1015 | 4 | 6 | 4 | 2 | 0.35 | Unfired |
| Comparative Example 1 | 66 | 0.22 | 65 | 43 | 65% | 1001 | 4 | 6 | 4 | 2 | 0.35 | Unfired |
| Comparative Example 2 | 66 | 0.22 | 65 | 43 | 48% | 498 | 10 | 6 | 4 | 2 | 0.35 | Fired |
| Comparative Example 3 | 66 | 0.22 | 65 | 43 | 48% | 1013 | 4 | 4 | 4 | 0 | — | Unfired |

Further, an electron microscope image (SEM image) of the plugging portion of the honeycomb filter of Example 1 was obtained, and the microstructure of the plugging portion was analyzed by the method described above. The results obtained are shown in Table 1. In the honeycomb filter of Example 1, a porosity of the plugging portion was 51% and a particle density of the particles constituting the plugging portion was 883 particles/mm². In addition, an average value of an equivalent circle diameter of each particle constituting the plugging portion was 4 μm.

Further, for the honeycomb filter of Example 1, the plugging length of the plugging portion described so far as shown in FIG. 5 was measured, and the average plugging length L1$_{(Ave)}$ in the center part, the average plugging length L2$_{(Ave)}$ in the outer peripheral part, and the difference ΔL between the plugging lengths were respectively determined. From the measured plugging length of the plugging portion, the average radius R of the center part was obtained, and the ratio (R/D) of the average radius R of the center part to the radius D of the end face of the honeycomb structure was calculated. Table 1 shows the results. In addition, the presence or absence of firing of the plugging portion at the time of manufacturing is described as a configuration of the plugging portion of the honeycomb filters manufactured by the Examples in the column of "Whether or not fired" of "Plugging portion" in Table 1. In this column, "Unfired" indicates that the plugging portion was not fired but only dried at the time of manufacturing to manufacture the honeycomb filter. On the other hand, "Fired" in this column indicates that the plugging portion was fired at the time of manufacturing to manufacture the honeycomb filter.

The honeycomb filter of Example 1 was evaluated for "erosion resistance" and "thermal shock resistance" in the following manner. The results are shown in Table 2.

TABLE 2

| | Erosion resistance | Thermal shock resistance |
| --- | --- | --- |
| Example 1 | OK | Excellent |
| Example 2 | OK | Excellent |
| Example 3 | OK | Excellent |
| Example 4 | OK | Excellent |
| Comparative Example 1 | NG | Excellent |
| Comparative Example 2 | OK | Acceptable |
| Comparative Example 3 | NG | Excellent |

[Erosion Resistance]

First, the honeycomb filter was canned into a can body, and the canned honeycomb filter was placed in a gas burner testing machine. Next, abrasive grains made of SiC were collided with the inflow end face of the honeycomb filter by the gas burner testing machine. Conditions for colliding abrasive grains were as follows. The amount of abrasive grains to be charged was 10 g. The temperature of the gas flowing into the honeycomb filter was 700° C. The flow rate of the gas flowing into the honeycomb filter was 120 m/second. The test time was 10 minutes, during which the abrasive grains were gradually charged. Thereafter, the honeycomb filter was taken out, and the taken-out honeycomb filter was photographed by tomography (CT), and the depth of the honeycomb filter grinded by collision of the abrasive grains (erosion depth (mm)) was calculated. In the erosion amount measurement test, the abrasive grains having an average particle diameter of 50 μm were used. The "erosion resistance" of the honeycomb filter was evaluated according to the following evaluation criteria. In Examples 1 to 4 and Comparative Examples 1 to 3, Comparative Example 1 is a reference honeycomb filter. The term "plugging penetration" means a state in which the plugging portion is grinded by erosion and at least a part of the plugging portion penetrates in the flow direction of the gas.

Evaluation "OK": When no "plugging penetration due to erosion" occurs in the honeycomb filter to be evaluated, the evaluation is "OK".

Evaluation "NG": When "plugging penetration due to erosion" occurs in the honeycomb filter to be evaluated, the evaluation is "NG".

[Thermal Shock Resistance]

First, a predetermined amount of soot was generated in an engine bench equipped with a 1.4 L gasoline engine under a constant operating condition, and the generated soot was deposited on the surface of the partition wall of the honeycomb filters of each Example and Comparative Example. Next, a regeneration treatment by post-injection was performed to increase the inlet gas temperature of the honeycomb filter, and when pressure loss in front and rear of the honeycomb filter started to decrease, the post-injection was turned off and the engine was switched to the idle state. The above procedure was repeated until cracks occurred in the honeycomb filter by gradually increasing the deposition amount of soot prior to the regeneration treatment. The deposition amount of soot in which cracks occur in the honeycomb filter was defined as the "deposition limit amount of soot" in each honeycomb filter. The "deposition limit amount of soot" of the honeycomb filter was evaluated according to the following evaluation criteria. In Examples 1 to 4 and Comparative Examples 1 to 3, Comparative Example 1 is a reference honeycomb filter.

Evaluation "Excellent": When the "deposition limit amount of soot" of the reference honeycomb filter is defined to 100%, and when the "deposition limit amount of soot" of the honeycomb filter to be evaluated is 130% or more, the evaluation is "Excellent".

Evaluation "Good": When the "deposition limit amount of soot" of the reference honeycomb filter is set to 100%, the "deposition limit amount of soot" of the honeycomb filter to be evaluated is 120% or more and less than 130%, the evaluation is "Good".

Evaluation "Acceptable": When the "deposition limit amount of soot" of the reference honeycomb filter is defined to 100%, and when the "deposition limit amount of soot" of the honeycomb filter to be evaluated is 100% or more and less than 120%, the evaluation is "Acceptable".

Evaluation "Failed": When the "deposition limit amount of soot" of the reference honeycomb filter is defined to 100%, and when the "deposition limit amount of soot" of the honeycomb filter to be evaluated is less than 100%, the evaluation is "Failed".

Examples 2 to 4 and Comparative Examples 1 to 3

The honeycomb filters of Examples 2 to 4 and Comparative Examples 1 to 3 were manufactured by changing the configuration of the honeycomb filters as shown in Table 1.

The main manufacturing method of the honeycomb filters of Examples 2 to 4 and Comparative Examples 1 to 3 is the same as that of the honeycomb filter of Example 1 except that the following points were changed at the time of manufacturing.

In Example 2, in the preparation of the plugging material, the average particle diameter of talc was increased, the amount of pore former was reduced, and the calcination temperature was lowered, as shown in Table 1.

In Example 3, in the preparation of the plugging material, the average particle diameter of talc was reduced, the amount of pore former was reduced, the calcination temperature was lowered, as shown in Table 1, and the rubbing amount was increased so that the plugging material entered longer.

In Example 4, in the preparation of the plugging material, the average particle diameter of talc was reduced, the amount of pore former was reduced, and the calcination temperature was lowered, as shown in Table 1.

In Comparative Example 1, in the preparation of the plugging material, the average particle diameter of talc was reduced, the amount of pore former was increased, and the calcination temperature was lowered, as shown in Table 1.

In Comparative Example 2, in the preparation of the plugging material, the average particle diameter of talc was reduced, the amount of pore former was reduced, as shown in Table 1, and the plugging material was filled in open end of each cell, and then the filled plugging material was fired to form a plugging portion.

In Comparative Example 3, in the preparation of the plugging material, the amount of pore former was reduced, the calcination temperature was lowered, as shown in Table 1, and the plugging material was rubbed without using a mask to be added later to the outer peripheral part so as to have a uniform length.

The honeycomb filters of Examples 2 to 4 and Comparative Examples 1 to 3 were also evaluated in the same manner as in Example 1. The results are shown in Table 2.

Results

The honeycomb filters of Examples 1 to 4 showed good results in both erosion resistance evaluation and thermal shock resistance evaluation.

On the other hand, in the honeycomb filter of Comparative Example 1, the porosity of the plugging portion was 65%, which was a relatively high value, and the evaluation result of the erosion resistance was "NG".

In the honeycomb filter of Comparative Example 2, in the microstructure of the plugging portion, the particle density was 498 particles/mm$^2$, and the average value of an equivalent circle diameter of each particle constituting the plugging portion was 10 μm. In the honeycomb filter of Comparative Example 2, the evaluation result of the thermal shock resistance was inferior to the honeycomb filters of Examples 1 to 4. That is, in the honeycomb filter of Comparative Example 2, the plugging portion is fired, the particles contained in the plugging material are strongly bonded by firing, and it is presumed that the thermal expansion coefficient of the plugging portion is relatively large. Therefore, in the honeycomb filter of Comparative Example 2, it is considered that the thermal stresses generated in the plugging portion become large, and cracks are likely to occur in thermal shock resistance evaluation.

The honeycomb filter of Comparative Example 3 had no difference in the plugging length between the center part and the outer peripheral part of the end face, and had a uniform plugging length (4 mm) over the entire end face. The honeycomb filter of Comparative Example 3 was inferior to the honeycomb filters of Examples 1 to 4 in the evaluation result of the erosion resistance.

INDUSTRIAL APPLICABILITY

The honeycomb filter of the present invention can be used as a filter to trap particulate matter in exhaust gas.

DESCRIPTION OF REFERENCE NUMERALS

1: partition wall, 2: cell, 2a: inflow cell, 2b: outflow cell, 3: circumferential wall, 4: honeycomb structure, 5: plugging portion, 5a: center plugging portion, 5b: outer peripheral plugging portion, 11: end face (inflow end face), 12: end face (outflow end face), 15: center part, 16: outer peripheral part, 100: honeycomb filter, D: equivalent circle radius (equivalent circle radius of end face of honeycomb structure), L, L1, and L2: plugging length, and R: average radius (average radius of center part).

What is claimed is:

1. A honeycomb filter comprising: a pillar-shaped honeycomb structure having a plurality of porous partition walls disposed to surround a plurality of cells which serve as fluid through channels extending from an inflow end face to an outflow end face; and a plurality of plugging portions disposed at an open end of predetermined cells of the plurality of cells on the inflow end face and at an open end of residual cells of the plurality of cells on the outflow end face; wherein a porosity of the plurality of plugging portions is 40 to 60%, a central plugging portion having a plugging length L in an extending direction of the plurality of cells of 5 mm or more is disposed at a center part side of an end on the inflow end face or an end on the outflow end face of the honeycomb structure, and an outer peripheral plugging portion having the plugging length L of less than 5 mm is disposed at an outer peripheral part side outside the center part of the end on the inflow end face or the end on the outflow end face of the honeycomb structure, an average plugging length $L1_{(Ave)}$, which is an average value of the plugging length L in the center part side, is 5 mm or more and 10 mm or less, an average plugging length $L2_{(Ave)}$, which is an average value of the plugging length L in the outer peripheral part side, is 2 mm or more and less than 5 mm, a difference ΔL between the average plugging length $L1_{(Ave)}$ in the center part side and the average plugging length $L2_{(Ave)}$ in the outer peripheral part side is 2 to 6 mm, a ratio (R/D) of an average radius R of the center part side to an equivalent circle radius D of the inflow end face or the outflow end face of the honeycomb structure is 0.2 to 0.38, and in an electron microscope image of the plurality of plugging portions, each plugging portion of the plurality of plugging portions is composed of a plurality of particles, an average value of an equivalent circle diameter of each particle is 3 to 5 μm, and a particle density of each plugging portion of the plurality of plugging portions is 750 to 1250 particles/mm$^2$.

2. The honeycomb filter according to claim 1, wherein a porosity of the plurality of porous partition walls is 60 to 70%.

3. The honeycomb filter according to claim 1, wherein a thickness of the plurality of porous partition walls is 0.1 to 0.3 mm.

4. The honeycomb filter according to claim 1, wherein the honeycomb structure has a cell density of 42 to 51 cells/cm$^2$.

* * * * *